(12) United States Patent
Gansmandel et al.

(10) Patent No.: US 12,230,152 B2
(45) Date of Patent: Feb. 18, 2025

(54) AIRCRAFT CONTROL SYSTEM WITH RESIDUAL ERROR CONTAINMENT

(71) Applicant: BOMBARDIER INC., Dorval (CA)

(72) Inventors: Franck Gansmandel, Montreal (CA); Timothy Smith, Bayswater (CA)

(73) Assignee: BOMBARDIER INC., Dorval (CA)

( * ) Notice: Subject to any disclaimer, the term of this patent is extended or adjusted under 35 U.S.C. 154(b) by 309 days.

(21) Appl. No.: 17/574,082

(22) Filed: Jan. 12, 2022

(65) Prior Publication Data
US 2022/0139230 A1 May 5, 2022

Related U.S. Application Data

(63) Continuation of application No. 16/464,471, filed as application No. PCT/IB2017/057455 on Nov. 28, 2017, now Pat. No. 11,257,383.
(Continued)

(51) Int. Cl.
*G08G 5/00* (2006.01)
*B64C 13/50* (2006.01)
(Continued)

(52) U.S. Cl.
CPC .......... *G08G 5/006* (2013.01); *B64C 13/503* (2013.01); *B64C 13/505* (2018.01); *B64D 45/00* (2013.01);
(Continued)

(58) Field of Classification Search
CPC ...... G08G 5/006; G08G 5/0039; B64D 45/00; G05D 1/0808; G05D 1/0077; B64C 13/505; B64C 13/503; G06F 11/16
See application file for complete search history.

(56) References Cited

U.S. PATENT DOCUMENTS

| 4,641,268 A | * | 2/1987 | Zweifel | G05D 1/0638 701/3 |
| 4,799,159 A | | 1/1989 | Davidson et al. | |

(Continued)

FOREIGN PATENT DOCUMENTS

WO 2015025262 A1 2/2015

OTHER PUBLICATIONS

International Searching Authority, International Search Report and Written Opinion re. International Patent Application No. PCT/IB2017/057455, Feb. 13, 2018.

*Primary Examiner* — Shon G Foley
(74) *Attorney, Agent, or Firm* — Norton Rose Fulbright Canada LLP (57) ABSTRACT

The aircraft control systems and methods disclosed herein are configured to detect a residual error associated with a flight control computer of an aircraft and mitigate the effect(s) of such residual error in order to maintain safe operation of the aircraft. In some embodiments, the systems and methods are configured to detect an out-of-flight-envelope situation of the aircraft and determine whether or not the flight control computer is attempting to recover the aircraft from the out-of-flight-envelope situation. If the flight control computer is perceived as attempting to recover the aircraft from the out-of-flight-envelope situation, the flight control computer is permitted to continue controlling the aircraft. Otherwise, the excursion outside of the normal flight envelope is perceives as potentially having been caused by a residual error and the flight control computer is prevented from continuing to control the aircraft.

14 Claims, 8 Drawing Sheets

Related U.S. Application Data (60) Provisional application No. 62/428,150, filed on Nov. 30, 2016.

(51) Int. Cl.
*B64D 45/00* (2006.01)
*G05D 1/00* (2006.01)

(52) U.S. Cl.
CPC ......... *G05D 1/0808* (2013.01); *G08G 5/0039* (2013.01)

(56) References Cited

U.S. PATENT DOCUMENTS

| | | |
|---|---|---|
| 5,881,971 A | 3/1999 | Hickman |
| 8,235,328 B2 | 8/2012 | Hirvonen |
| 8,386,093 B2 | 2/2013 | Lin et al. |
| 2013/0030607 A1 | 1/2013 | Schulte et al. |
| 2015/0081140 A1 | 3/2015 | Moune et al. |
| 2016/0202701 A1 | 7/2016 | Burte |

\* cited by examiner

CRITERIA 58

| PARAMETER | FLIGHT ENVELOPE LIMITS | DISABLING RANGE | THRESHOLD | PERSISTENCE | CLAW CORRECTNESS (NO TRIP) |
|---|---|---|---|---|---|
| ROLL ANGLE | ± 80 DEG | ± 180 DEG | ± 120 DEG | 1 SEC | AILERON COMMAND TREND IN DIRECTION OF RECOVERY AND ≥ 15 DEG |
| PITCH ANGLE | 30 NOSE UP 20 NOSE DOWN | N/A | 40 DEG NOSE UP 30 DEG NOSE DOWN TRIP ANYWAY AT 60 DEG NOSE UP OR NOSE DOWN | 1 SEC | ELEVATOR COMMAND TREND IN DIRECTION OF RECOVERY AND ≥30% LIMIT AND STAB RATE COMMAND TREND NON-NULL IN DIRECTION OF RECOVERY |
| AOA | + 18.5 DEG | N/A | + 25 DEG | 1 SEC | N/A |
|  | N/A | N/A | -15 DEG | 1 SEC | N/A |
| CAS | VD=360 kts | N/A | 400 kts | 1 SEC | N/A |
|  | N/A | N/A | 60 kts | 1 SEC | N/A |
| MACH | MD=0.89 | N/A | 0.91 | 1 SEC | N/A |
|  | N/A | N/A | 0.092 | 1 SEC | N/A |

AIRCRAFT CONTROL SYSTEM WITH RESIDUAL ERROR CONTAINMENT

CROSS REFERENCE TO RELATED APPLICATION(S)

This application is a continuation of U.S. patent application Ser. No. 16/464,471 filed on Nov. 28, 2017, which is a national phase application under 35 U.S.C. 371 of International Patent Application No. PCT/IB2017/057455 filed on Nov. 28, 2017, which claims priority to U.S. Provisional Patent Application Ser. No. 62/428,150 filed on Nov. 30, 2016, the entire contents of which are incorporated herein by reference.

TECHNICAL FIELD

The disclosure relates generally to control systems, and more particularly to control systems of aircraft.

BACKGROUND OF THE ART

Fly-by-wire ("FBW") aircraft flight control systems are increasingly becoming the preferred type of flight control system for modern aircraft. The FBW type of control system replaces the relatively heavier mechanical and hydro-mechanical types of flight control systems. A FBW flight control system commonly comprises a computer system interposed between: (1) the flight control inputs given both automatically by various aircraft component sensors and subsystems such as the autopilot, and manually by the pilots via, e.g., sidestick or yoke controllers, switches, levers, etc.; and (2) the aircraft flight control surfaces and other devices that ultimately control the operation and direction of the aircraft in flight.

With such FBW systems, there is a potential risk for an unknown residual error to exist in the software run by the computer system, where such residual error may not necessarily manifest itself during testing but could potentially manifest itself during operation of the aircraft. Due to the unknown nature of such potential residual error it is desirable that the occurrence of such residual error be detected and that its effects be mitigated to ensure a safe operation of the aircraft.

SUMMARY

In one aspect, the disclosure describes a control system for an aircraft. The control system comprises:
  a sensor configured to sense a flight parameter of the aircraft;
  a flight control computer operatively coupled to receive one or more signals representative of the flight parameter sensed by the sensor and configured to control one or more aspects of operation of the aircraft at least partially based on the flight parameter; and
  a monitoring apparatus configured to:
    receive the one or more signals representative of the flight parameter sensed by the sensor;
    determine that the flight parameter is indicative of an out-of-flight-envelope situation of the aircraft;
    while the aircraft is in the out-of-flight-envelope situation, evaluate one or more control commands output by the flight control computer and associated with the flight parameter;
    conditioned upon the one or more control commands being indicative of the flight control computer attempting to cause the aircraft to return within its flight envelope, allow the flight control computer to continue controlling the one or more aspects of operation of the aircraft; and
    conditioned upon the one or more control commands being indicative of the flight control computer not attempting to cause the aircraft to return within its flight envelope, prevent the flight control computer from controlling the one or more aspects of operation of the aircraft.

The control system may comprise an alternate control device. The monitoring apparatus may be configured to, conditioned upon the one or more control commands being indicative of the flight control computer not attempting to cause the aircraft to return within its flight envelope, allow the one or more aspects of operation of the aircraft to be controlled using the alternate control device.

The monitoring apparatus may be configured to, conditioned upon the flight parameter reaching a trip limit beyond a flight envelope of the aircraft, prevent the flight control computer from controlling the one or more aspects of operation of the aircraft and allow the one or more aspects of operation of the aircraft to be controlled using the alternate control device.

The alternate control device may have reduced functionality relative to the flight control computer.

Evaluating the one or more control commands may comprise computing a trend associated with a plurality of the control commands.

Evaluating the one or more control commands may comprise computing an average of successive control commands.

Determining that the flight parameter of the aircraft is indicative of the out-of-flight-envelope situation of the aircraft may comprise determining whether the flight parameter satisfies a persistence criterion.

The monitoring apparatus may be configured to use one or more monitoring algorithms that are different from one or more command algorithms used by the flight control computer.

The monitoring apparatus may comprise monitoring instructions stored in a memory partition of the flight control computer that is separate from a memory partition that stores command instructions configured to generate the one or more control commands by the flight control computer.

The flight parameter may be a roll angle of the aircraft.
The flight parameter may be a pitch angle of the aircraft.
The flight parameter may be an angle of attack of the aircraft.
The flight parameter may be a calibrated air speed of the aircraft.
The flight parameter may be a Mach number of the aircraft.
The flight control computer may comprise a command lane and a monitoring lane.

Embodiments may include combinations of the above features.

In another aspect, the disclosure describes an aircraft comprising a system as described herein.

In another aspect, the disclosure describes a monitoring apparatus for a control system of an aircraft. The monitoring apparatus comprises:
  one or more data processors; and
  non-transitory machine-readable memory storing instructions executable by the one or more data processors and configured to cause the one or more data processors to:

determine that a flight parameter of the aircraft is indicative of an out-of-flight-envelope situation of the aircraft while one or more aspects of operation of the aircraft are controlled using a flight control computer;

while the aircraft is in the out-of-flight-envelope situation, evaluate one or more control commands output by the flight control computer and associated with the flight parameter;

conditioned upon the one or more control commands being indicative of the flight control computer attempting to cause the aircraft to return within its flight envelope, allow the flight control computer to continue controlling the one or more aspects of operation of the aircraft; and conditioned upon the one or more control commands being indicative of the flight control computer not attempting to cause the aircraft to return within its flight envelope, prevent the flight control computer from controlling the one or more aspects of operation of the aircraft.

The instructions may be configured to cause the one or more data processors to, conditioned upon the one or more control commands being indicative of the flight control computer not attempting to cause the aircraft to return within its flight envelope, allow the one or more aspects of operation of the aircraft to be controlled using an alternate control device.

The instructions may be configured to cause the one or more data processors to, conditioned upon the flight parameter reaching a trip limit beyond a flight envelope of the aircraft, prevent the flight control computer from controlling the one or more aspects of operation of the aircraft and allow the one or more aspects of operation of the aircraft to be controlled using an alternate control device.

Evaluating the one or more control commands may comprise computing a trend associated with a plurality of the control commands.

Evaluating the one or more control commands may comprise computing an average of successive control commands.

Determining that the flight parameter of the aircraft is indicative of the out-of-flight-envelope situation of the aircraft may comprise determining whether the flight parameter satisfies a persistence criterion.

The machine-readable memory may comprise a memory partition of the flight control computer that is separate from a memory partition that stores command instructions configured to generate the one or more control commands by the flight control computer.

The flight parameter may be a roll angle of the aircraft.

The flight parameter may be a pitch angle of the aircraft.

The flight parameter may be an angle of attack of the aircraft.

The flight parameter may be a calibrated air speed of the aircraft.

The flight parameter may be a Mach number of the aircraft.

Embodiments may include combinations of the above features.

In another aspect, the disclosure describes an aircraft comprising a monitoring apparatus as described herein.

In a further aspect, the disclosure describes a method for controlling an aircraft during flight. The method comprises:

determining that a flight parameter of the aircraft is indicative of an out-of-flight-envelope situation of the aircraft while one or more aspects of operation of the aircraft are controlled using a flight control computer;

while the aircraft is in the out-of-flight-envelope situation, evaluating one or more control commands output by the flight control computer and associated with the flight parameter;

conditioned upon the one or more control commands being indicative of the flight control computer attempting to cause the aircraft to return within its flight envelope, allowing the flight control computer to continue controlling the one or more aspects of operation of the aircraft; and conditioned upon the one or more control commands being indicative of the flight control computer not attempting to cause the aircraft to return within its flight envelope, preventing the flight control computer from controlling the one or more aspects of operation of the aircraft.

The method may comprise, conditioned upon the one or more control commands being indicative of the flight control computer not attempting to cause the aircraft to return within its flight envelope, allowing the one or more aspects of operation of the aircraft to be controlled using an alternate control device of the aircraft.

The method may comprise, conditioned upon the flight parameter reaching a trip limit beyond a flight envelope of the aircraft, preventing the flight control computer from controlling the one or more aspects of operation of the aircraft and allowing the one or more aspects of operation of the aircraft to be controlled using an alternate control device of the aircraft.

The alternate control device may have reduced functionality relative to the flight control computer.

Evaluating the one or more control commands may comprise computing a trend associated with a plurality of the control commands.

Evaluating the one or more control commands may comprise computing an average of successive control commands.

Determining that the flight parameter of the aircraft is indicative of the out-of-flight-envelope situation of the aircraft may comprise determining whether the flight parameter satisfies a persistence criterion.

The evaluation of the one or more control commands may be conducted using one or more monitoring algorithms that are different from one or more command algorithms used by the flight control computer.

The evaluation of the one or more control commands is conducted using monitoring instructions stored in a memory partition of the flight control computer that is separate from a memory partition that stores command instructions configured to generate the one or more control commands by the flight control computer.

The flight parameter may be a roll angle of the aircraft.

The flight parameter may be a pitch angle of the aircraft.

The flight parameter may be an angle of attack of the aircraft.

The flight parameter may be a calibrated air speed of the aircraft.

The flight parameter may be a Mach number of the aircraft.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The present disclosure relates to aircraft control systems and related methods for controlling one or more aspects of operation of an aircraft during flight. In various embodiments, the systems and methods disclosed herein are configured to detect a residual error associated with a flight control computer of the aircraft and mitigate the effect(s) of such residual error to maintain safe operation of the aircraft. In some embodiments, the systems and methods are configured to detect an out-of-flight-envelope situation of the aircraft and determine whether or not the flight control computer is attempting to recover the aircraft from the out-of-flight-envelope situation. If the flight control computer is perceived as attempting to recover the aircraft from the out-of-flight-envelope situation, the flight control computer may be permitted to continue controlling the aircraft. Otherwise, if the flight control computer is not perceived as attempting to recover the aircraft from the out-of-flight-envelope situation, the excursion outside of the normal flight envelope is determined to potentially be caused by a residual error and the flight control computer may then be (e.g., temporarily) prevented from continuing to control the aircraft.

Aspects of various embodiments are described through reference to the drawings.

Figure 1:
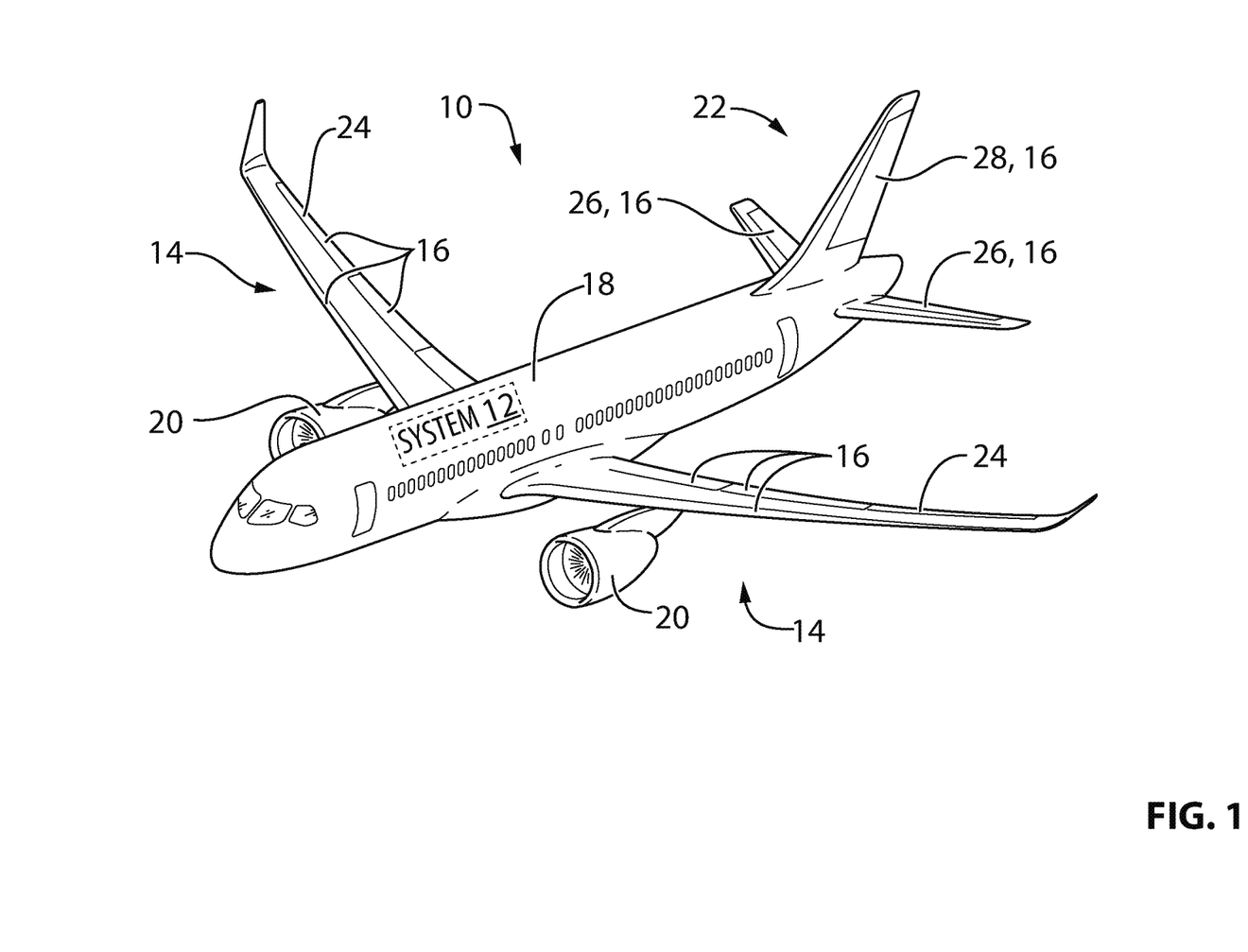
FIG. 1 is a perspective view of an exemplary aircraft comprising a control system as disclosed herein.

FIG. 1 is a perspective view of an exemplary aircraft 10 which may comprise control system 12 (shown schematically) for controlling at least some aspect(s) of operation of aircraft 10. For example, control system 12 may be part of a fly-by-wire system of aircraft 10. In various embodiments, aircraft 10 may be any type of aircraft such as corporate (e.g., business jet), private, commercial and passenger aircraft. For example, aircraft 10 may be a narrow-body, twin-engine jet airliner. Aircraft 10 may be a fixed-wing aircraft. Aircraft 10 may comprise one or more wings 14 including one or more flight control surfaces 16, fuselage 18, one or more engines 20 and empennage 22 of suitable type. One or more engines 20 may be mounted to one or more of wings 14. Alternatively, or in addition, one or more of engines 20 may be mounted to fuselage 18 or be installed on aircraft 10 in any suitable manner. As flight control surfaces 16, aircraft 10 may also comprise ailerons 24 for controlling a roll movement (i.e., about the longitudinal axis) of aircraft 10; elevators 26 for controlling a pitch movement of aircraft 10; and rudder 28 for controlling a yaw movement of aircraft 10.

It is understood that control system 12 or part(s) thereof may be located onboard aircraft 10 and/or remotely from aircraft 10. Similarly, it is understood that the methods disclosed herein or part(s) thereof could be conducted onboard aircraft 10 and/or remotely from aircraft 10. For example, relevant information could be transmitted to/from aircraft 10 in order to achieve control of some aspects of operation of aircraft 10 remotely (e.g., from a ground station).

Figure 2:
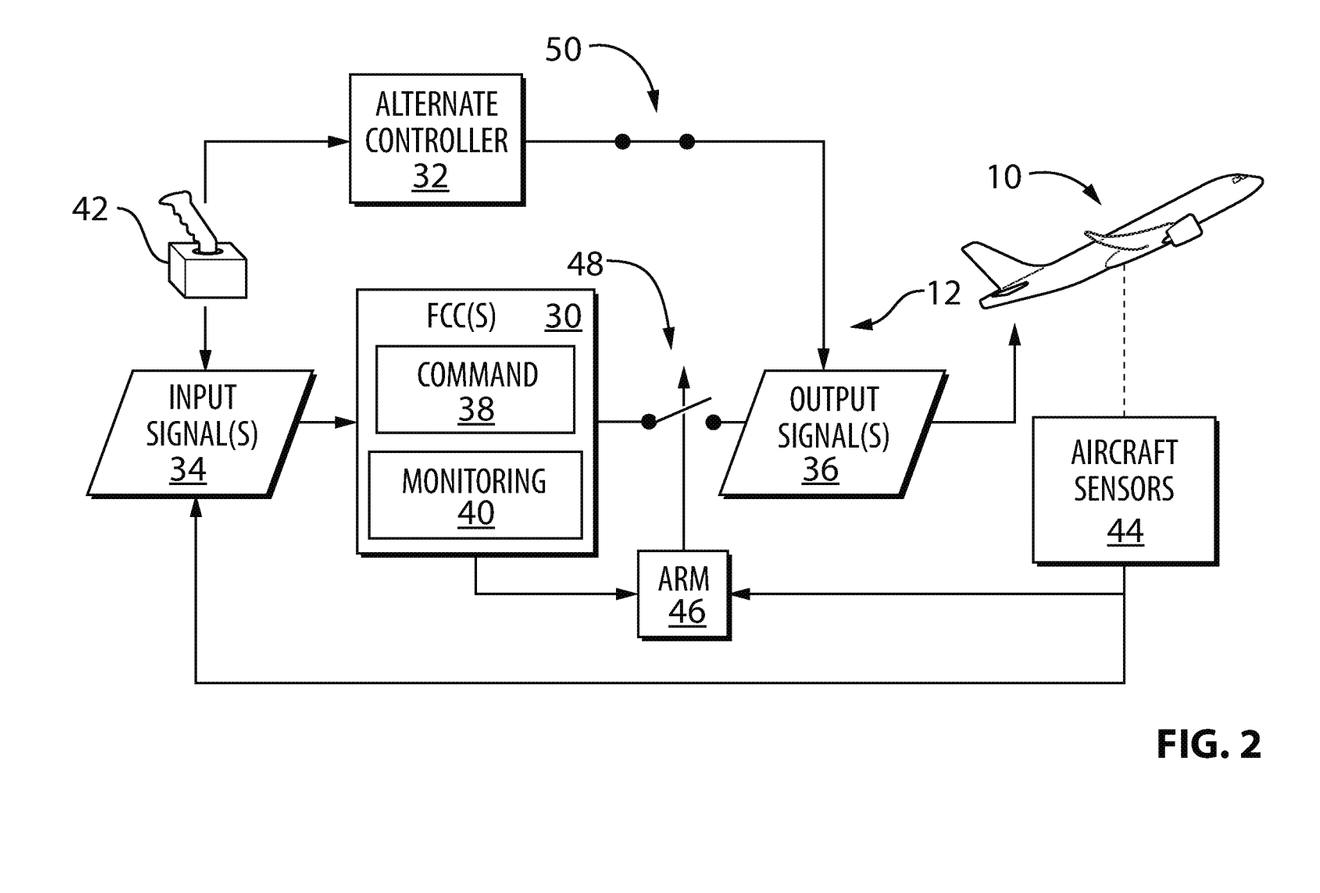
FIG. 2 is a schematic illustration of the aircraft of FIG. 1 together with an exemplary embodiment of the control system.

FIG. 2 is a schematic illustration of aircraft 10 with an exemplary embodiment of control system 12 for controlling one or more aspects of operation of aircraft 10. In some embodiments, control system 12 may be disposed onboard of aircraft 10 and may comprise one or more computers configured to perform the methods disclosed herein. In light of the present disclosure, one of ordinary skill would understand that control system 12 may comprise additional components not shown herein for the sake of clarity. Control system 12 may be configured to control or assist in controlling some aspect(s) of operation such as, for example, roll, pitch and/or yaw of aircraft 10 during flight by generating suitable commands for actuating ailerons 24, elevators 26 and/or rudder 28 of aircraft 10. In some embodiments, control system 12 may be configured to control or assist in controlling a calibrated air speed, Mach number and/or angle of attack of aircraft 10 during flight. In some embodiments, control system 12 may automatically or semi-automatically control some aspect(s) of operation by generating suitable commands for actuating flight control surfaces 16 or other devices of aircraft 10. In some embodiments and/or in some mode(s) of operation, control system 12 may perform control functions based on input from a pilot.

Control system 12 may comprise one or more computers. For example control system 12 may comprise one or more flight control computers 30 (referred hereinafter as "FCC 30") and one or more alternate flight control devices (e.g., computer(s)) such as alternate controller 32. In some embodiments, alternate controller 32 may be of the type known as an "alternate flight control unit". Alternate controller 32 may be an independent controller of control system 12 of aircraft 10. In some embodiments, FCC 30 and alternate controller 32 may carry out additional functions than those described herein. FCC 30 may be a primary flight control computer (PFCC) of aircraft 10 and may be used to control some aspect(s) of flight (e.g., roll, pitch and yaw) of aircraft 10 during a normal mode of operation. Alternate controller 32 may be used as a back-up control device used in case of malfunction of FCC 30 during an alternate mode (e.g., a more "direct mode") of operation of aircraft 10. In some embodiments, alternate controller 32 may have reduced functionality in comparison with FCC 30 and may therefore require more involvement from a pilot of aircraft 10. For example, alternate controller 32 may make use of more simplified control laws (referred hereinafter as "CLAWS") in comparison with the CLAWS of FCC 30 but may still permit safe operation of aircraft 10 in case of malfunction of FCC 30.

Figure 4:
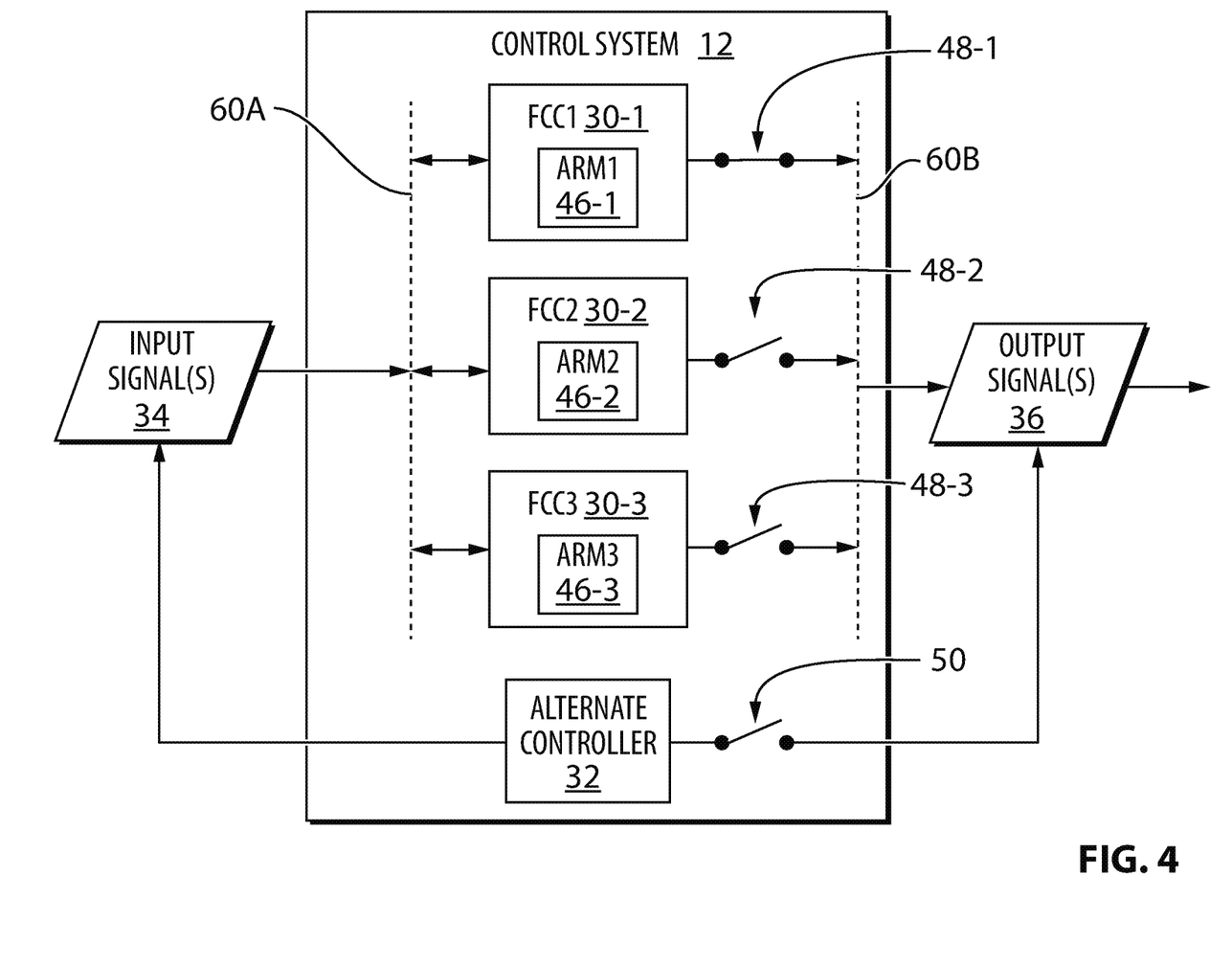
FIG. 4 is a schematic illustration of another exemplary embodiment of the control system of FIG. 2.

FCC 30 may receive input signals 34 and generate, using suitable CLAWS, output signals 36 for controlling some aspect(s) of operation of aircraft 10 via suitable actuators (not shown) coupled to ailerons 24, elevators 26 and/or rudder 28, other flight control surface(s) 16 or other devices of aircraft 10. FCC 30 may comprise one or more data processors and machine-readable memory(ies) storing instructions executable by the data processor and configured to cause FCC 30 to carry out one or more control functions associated with the operation of aircraft 10 during flight. In some embodiments, FCC 30 may be configured to operate under a self-monitoring regime to detect faults of FCC 30. For example, FCC 30 may comprise a command lane 38 (command channel) and monitoring lane 40 (monitoring channel) with dissimilar processors (command lane-A type and monitor lane-B type). Monitoring lane 40 may be configured to monitor the operation of command lane 38 of FCC 30 and cause FCC 30 to be taken offline if a fault is detected. If FCC 30 is taken offline, control system 12 may then rely on alternate controller 32 for the alternate/direct mode of operation. In cases where control system 12 comprises a plurality of redundant FCCs 30 as illustrated in FIG. 4, the fault and taking offline of one FCC 30 may cause another FCC 30 to take over the control function. Hence using alternate controller 32 may be avoided unless all of the redundant FCCs 30 have been taken offline. In some embodiments, FCC(s) 30 may be of the type and configured as disclosed in U.S. Pat. No. 8,818,575, which is incorporated herein by reference.

Input signals 34 may be provided by a pilot of aircraft 10 via one or more input devices 42, which may include a sidestick or yoke controller, switch(es), lever(s), etc, and/or other sources. Input signals 34 may also include sensed signals provided by suitable sensors 44. Input signals 34 may be representative of values derived from sensed signals acquired via sensors 44 or otherwise calculated. For example, input signals 34 may be representative of flight parameters of aircraft 10 such as a roll angle, a pitch angle, an angle of attack, a calibrated air speed and a Mach number. FCC 30 may control one or more aspects of operation of aircraft 10 based at least in part on such flight parameters and/or other type(s) of input signals 34.

Control system 12 may also comprise one or more monitoring apparatus such as aircraft response monitoring apparatus 46 (referred hereinafter as "ARM 46") for monitoring the operation of FCC 30 for the occurrence of a "residual error" for example. A residual error is an error that is unknown in the software run by FCC 30 and that may not manifest itself during testing of FCC 30 and of aircraft 10 but that could potentially manifest itself during operation of aircraft 10. Due to such unknown and unpredictable nature of such potential residual error(s) in the software of FCC 30, it is desirable that the occurrence of such residual error be recognized and that its potential effects on the operation of aircraft 10 be mitigated to ensure a safe operation of aircraft 10. More details on residual errors are provided in U.S. Patent Publication No. 2016/0202701 A1, which is incorporated herein by reference.

In some embodiments, command lane 38 and monitoring lane 40 of FCC 30 may both run substantially identical algorithms with substantially identical CLAWS. Accordingly, it is possible that such residual error could manifest itself in both command lane 38 and monitoring lane 40 (e.g., simultaneously) and therefore may not be detectable by monitoring lane 40. Furthermore, since each FCC 30 of a control system 12 comprising a plurality of redundant FCCs 30 may be substantially identical and running identical software, such unknown residual error in the software could potentially be inherent to all FCCs 33.

ARM 46 may provide an independent monitoring function for detecting the occurrence of such unknown residual error in FCC 30 and mitigate its effects. The independence of ARM 46 may be provided by the use one or more monitoring algorithms that are executed by ARM 46 that are different from the one or more command algorithms that are executed by FCC 30 so that a same residual error occurring in FCC 30 would likely not occur in ARM 46 and would therefore be detectable by ARM 46.

In various embodiments, ARM 46 may be configured to detect such residual error by detecting a situation where aircraft 10 may be operating outside of its normal flight envelope and then monitoring one or more control commands (e.g., output signals 36) being output by FCC 30 to see whether or not FCC 30 is attempting to cause aircraft 10 to return within its flight envelope. In other words, ARM 46 may monitor the validity of the one or more control commands generated by FCC 30 during the out-of-flight-envelope situation. The detection of the out-of-flight-envelope situation may be detected by receiving one or more signals representative of one or more flight parameters sensed by sensor(s) 44 or otherwise generated and determining that the flight parameter(s) is/are indicative of an out-of-flight-envelope situation of aircraft 10. While aircraft 10 is in the out-of-flight-envelope situation, ARM 46 may evaluate one or more control commands output by FCC 30 and associated with the one or more flight parameters. For example, an aileron command may be associated with the roll of aircraft and an elevator command may be associated with the pitch of aircraft 10. If the control commands output by FCC 30 are not perceived to be trying to recover aircraft 10 from the out-of-flight-envelope situation by ARM 46, then such excursion outside of the flight envelope may be perceived by ARM 46 as potentially having been caused by a residual error in FCC 30 and ARM 46 may cause FCC 30 to be taken offline as shown schematically in FIG. 2 by way of switch 48 being open. As FCC 30 is taken offline or otherwise deactivated to prevent FCC 30 from continuing to control aircraft 10, the control of aircraft 10 may be transferred from a normal mode of operation to an alternate/direct mode of operation using alternate controller 32 as shown schematically by the closing of switch 50 in FIG. 2. Since the software run by alternate controller 32 is different from the software run by FCC 30, the same residual error that has occurred within FCC 30 would likely not occur in alternate controller 32 and safe operation of aircraft 10 may be resumed via alternate controller 32.

In some embodiments, the taking offline of FCC 30 and the associate transfer to direct mode may be temporary only. For example, after being taken offline, FCC 30 may be reset (e.g., re-booted) and subsequently be permitted to resume its control function(s).

While the approach taken by ARM 46 may be effective in detecting a residual error in FCC 30, this approach may also prevent unnecessary/nuisance deactivation of FCC 30 in the event of a temporary flight condition (e.g., environmental disturbance) that may have caused a temporary excursion of aircraft 10 outside of its normal flight envelope. For example, in the normal mode of operation, FCC 30 may be configured to adequately recover aircraft 10 from an out-of-flight-envelope situation that may have been caused by an unexpected/temporary environmental condition such as a strong wind gust for example. Accordingly, in such situations, and in the absence of a residual error, it may be preferable to let FCC 30 remedy the out-of-flight-envelope situation as it is configured to do. The distinction between a residual error and a temporary environmental condition that FCC 30 can recover from may be established by ARM 46 by determining that the control commands output by FCC 30 are perceived by ARM 46 to be attempting to recover aircraft 10 from the out-of-flight-envelope situation (e.g., monitor the response of FCC 30 to the out-of-flight-envelope situation). In such case, such excursion outside of the flight envelope may be perceived by ARM 46 as not having been caused by a residual error in FCC 30 and ARM 46 may allow FCC 30 to continue controlling the one or more aspects of operation of aircraft 10 and be permitted to recover aircraft 10 from the out-of-flight-envelope situation. This can be represented schematically in FIG. 2 by having switch 48 closed and switch 50 open for example.

Figure 3:
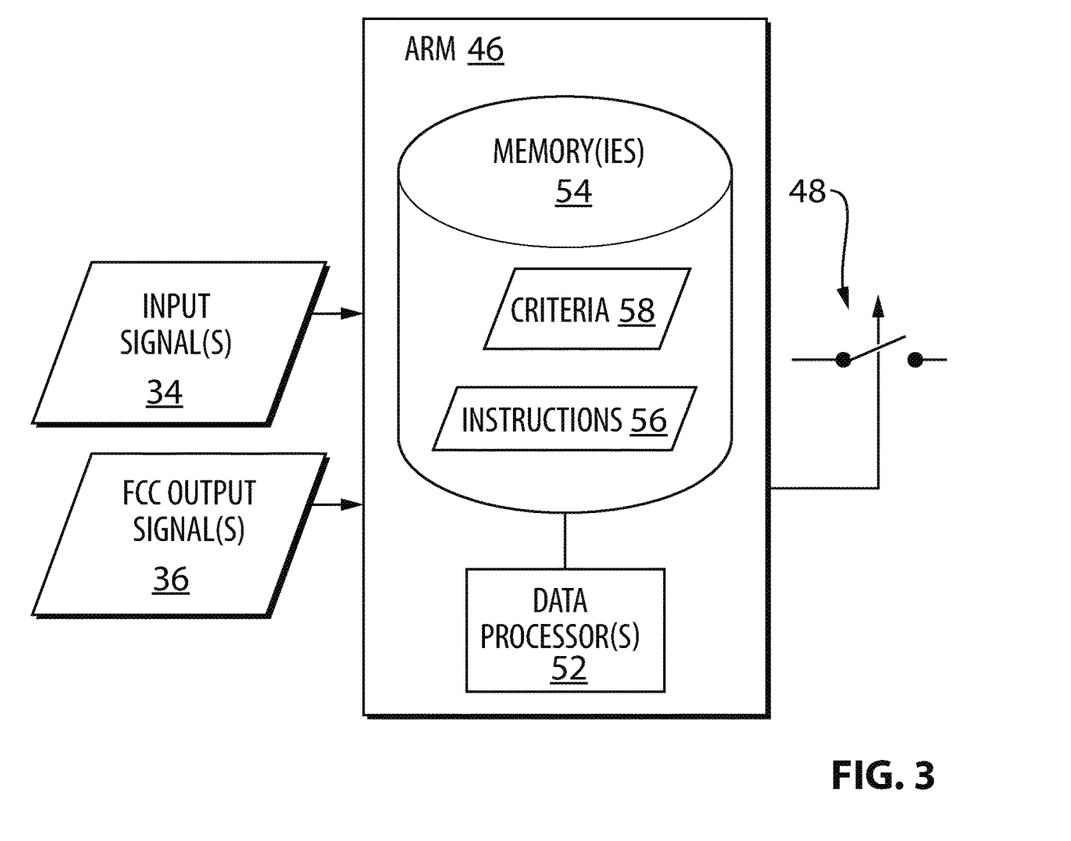
FIG. 3 is a schematic illustration of an exemplary aircraft response monitor of the control system of FIG. 2.

FIG. 3 is a schematic representation of an exemplary embodiment of ARM 46 of control system 12. ARM 46 may comprise one or more data processors 52 (referred hereinafter in the singular) of suitable type and which may be used to perform methods disclosed herein in entirety or in part. In some embodiments, methods disclosed herein may be performed using a single data processor 52 or, alternatively, part(s) of the methods disclosed herein could be performed using multiple data processors 52. ARM 46 may comprise machine-readable memory 54 storing instructions 56 executable by data processor 52 and configured to cause data processor 52 to carry out one or more tasks associated with the monitoring of FCC 30 for residual errors. Machine-readable memory 54 may also store data representative of one or more criteria 58 useful in the determination of whether the control commands (i.e., FCC output signal(s) 36) are correct and are indicative of FCC 30 attempting to recover aircraft 10 from the out-of-flight-envelope situation.

Data processor 52 may comprise any suitable device(s) configured to cause a series of steps to be performed by ARM 46 so as to implement a computer-implemented process such that instructions 56, when executed by ARM 46, may cause the functions/acts specified in the methods described herein to be executed. Data processor 52 may comprise, for example, any type of general-purpose microprocessor or microcontroller, other suitably programmed or programmable logic circuits, or any combination thereof.

Memory 54 may comprise any suitable machine-readable storage medium or media. Memory 54 may comprise non-transitory computer readable storage medium such as, for example, but not limited to, an electronic, magnetic, optical, electromagnetic, infrared, or semiconductor system, apparatus, or device, or any suitable combination of the foregoing. Memory 54 may include a suitable combination of any type of computer memory that is located either internally or externally to ARM 46. Memory 54 may comprise any storage means (e.g. devices) suitable for retrievably storing machine-readable instructions 56 executable by data processor 52, and, criteria 58.

Various aspects of the present disclosure may be embodied as systems, devices, methods and/or computer program products. Accordingly, aspects of the present disclosure may take the form of an entirely hardware embodiment, an entirely software embodiment or an embodiment combining software and hardware aspects. Furthermore, aspects of the present disclosure may take the form of a computer program product embodied in one or more non-transitory computer readable medium(ia) (e.g., memory 54) having computer readable program code (e.g., instructions 56) embodied thereon. The computer program product may, for example, be executed to cause the execution of one or more methods disclosed herein in entirety or in part. Computer program code for carrying out operations for aspects of the present disclosure in accordance with instructions 56 may be written in any combination of one or more programming languages. Such program code may be executed entirely or in part by ARM 46 or other data processing device(s). It is understood that, based on the present disclosure, one skilled in the relevant arts could readily write computer program code for implementing the methods disclosed herein.

FIG. 4 is a schematic illustration of another exemplary embodiment of control system 12. As explained above, control system 12 may comprise a plurality of redundant FCCs 30 shown labeled as FCC1 30-1, FCC2 30-2 and FCC3 30-3, Each FCC 30 may be substantially identical and only one FCC 30 may be in control at a time as schematically illustrated by switch 48-1 being closed and switches 48-2 and 48-3 being open. As explained above, when a fault with the active FCC 30 is detected by monitoring lane 40 (shown in FIG. 2) for example, that FCC 30 may be taken offline and another redundant FCC 30 may be brought online to take over the associated control function. In the event of all three FCCs 30 being taken offline, control system 12 may then rely on alternate controller 32 for the safe operation of aircraft 10. This scenario can be represented schematically in FIG. 4 by the opening of switches 48-1, 48-2 and 48-3 and the closing of switch 50 for example. The plurality of FCCs 30 may be operatively coupled to receive input signals 34 via a suitable data bus 60A. Similarly, the plurality of FCCs 30 may be operatively coupled to deliver output signals 36 via suitable data bus 60B.

In various embodiments, a single ARM 46 may be configured to monitor the plurality of FCCs 30, or, each FCC 30 may be associated with its own dedicated ARM 46 as illustrated in FIG. 4 as ARM1 46-1, ARM2 46-2 and ARMS 46-3. In various embodiments, ARM(s) 46 may comprise hardware components that are separate and independent from FCCs 30, or, alternatively, ARM(s) 46 may be integrated with its/their associated FCCs 30. For example, each ARM 46 may comprise monitoring instructions stored in a memory partition of an associated FCC 30 separate from a memory partition that stores command instructions configured to generate the one or more control commands by the associated FCC 30. In any case, ARM(s) 46 may make use of algorithms that are different than those of FCC 30 as explained above.

Figure 5:
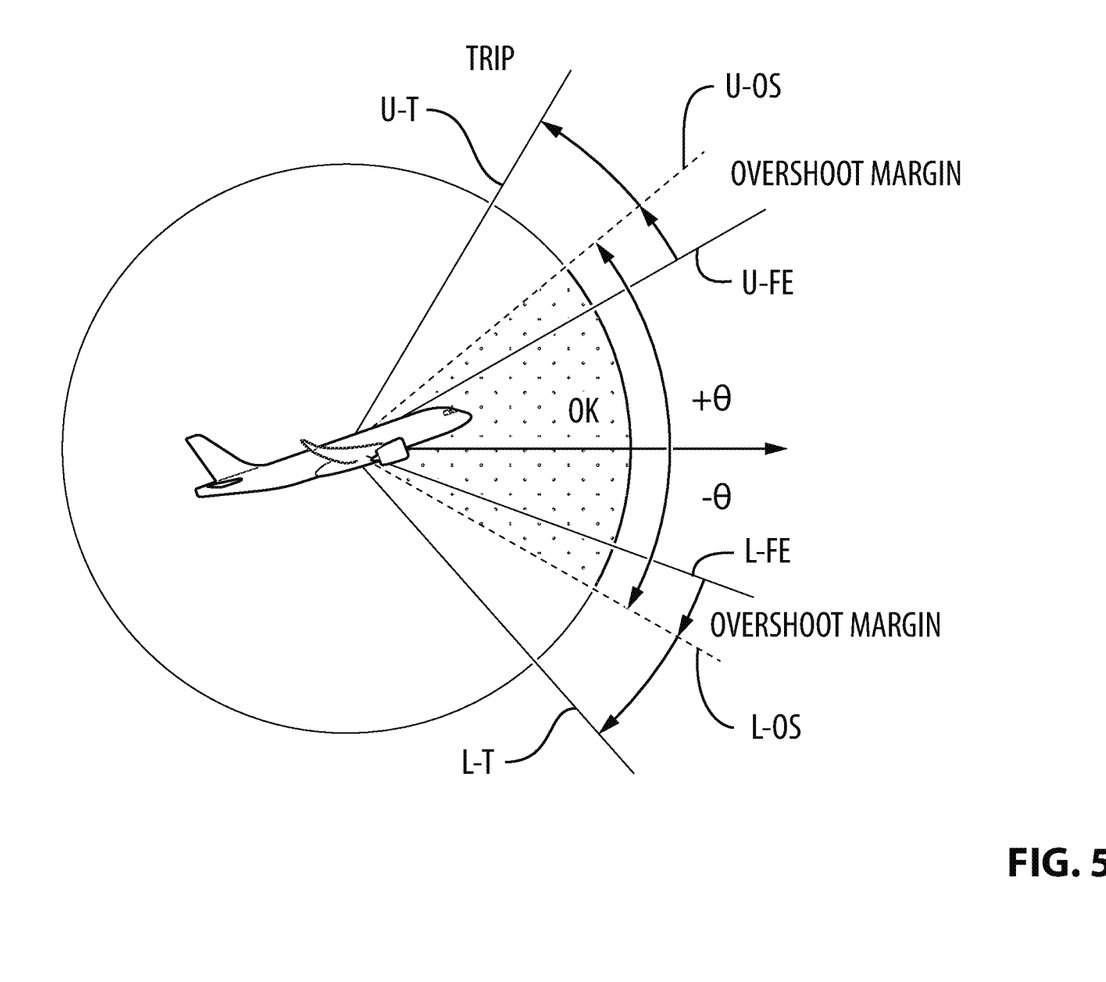
FIG. 5 is an exemplary graphical representation of an exemplary flight regime associated with the pitch of the aircraft of FIG. 1.

FIG. 5 is an exemplary graphical representation of an exemplary flight regime associated with the pitch of aircraft 10. The region labeled as "OK" of the normal pitch flight envelope is shown between line U-FE representing the upper boundary of the pitch flight envelope and line L-FE representing the lower boundary of the pitch flight envelope of aircraft 10. Region OK bounded by lines U-FE and L-FE, aircraft 10 may be considered to be within its normal pitch flight envelope and therefore ARM 46 may configured so that a pitch value within region OK may not cause FCC 30 to be taken offline. In some embodiments, an optional overshoot margin may be provided so that a pitch excursion beyond the normal flight envelope but still within the overshoot margin may similarly not cause FCC 30 to be taken offline. In reference to FIG. 5, an exemplary upper overshoot margin is illustrated between line U-OS and U-FE. Similarly, an exemplary lower overshoot margin is illustrated between line L-OS and L-FE.

However, a pitch excursion beyond lines U-FE or L-FE, or alternatively, beyond lines U-OS or L-OS if an overshoot margin is provided, will signal an out-of-flight-envelope situation. ARM 46 will then evaluate control commands output by FCC 30 to determine whether or not FCC 30 is attempting to recover aircraft 10 from the out-of-flight-envelope situation and cause FCC 30 to be taken offline if ARM 46 determines that the control commands are incorrect due to a residual error for example.

In some embodiments, a trip limit beyond the flight envelope may be used to cause FCC 30 to be taken offline regardless of whether FCC 30 is trying to recover aircraft 10 from the out-of-flight-envelope situation. In reference to FIG. 5, an upper trip limit beyond the overshoot margin indicated by line U-OS is indicated by line U-T. Similarly, a lower trip limit beyond the overshoot margin indicated by line L-OS is indicated by line L-T. Within the region between lines U-T and U-OS and within the region between L-T and L-OS, FCC 30 may be kept in control of aircraft 10 if ARM 46 determines that FCC 30 is attempting to recover aircraft 10 from the out-of-flight-envelope situation. However, any excursion of aircraft 10 beyond upper trip limit U-T or beyond lower trip limit L-T will cause FCC 30 to be taken offline and control of aircraft 10 to transfer to direct mode using alternate controller 32. For example, in addition to monitoring the control commands, ARM 46 may continue to monitor the flight parameter(s) to determine if FCC 30 is succeeding in recovering from the out-of-flight-envelope situation. In some embodiments, if ARM 46 determines that FCC 30 is not succeeding (e.g., within a predetermined persistence time period), FCC 30 may be taken offline irrespective of the validity of the control commands.

Figure 6:
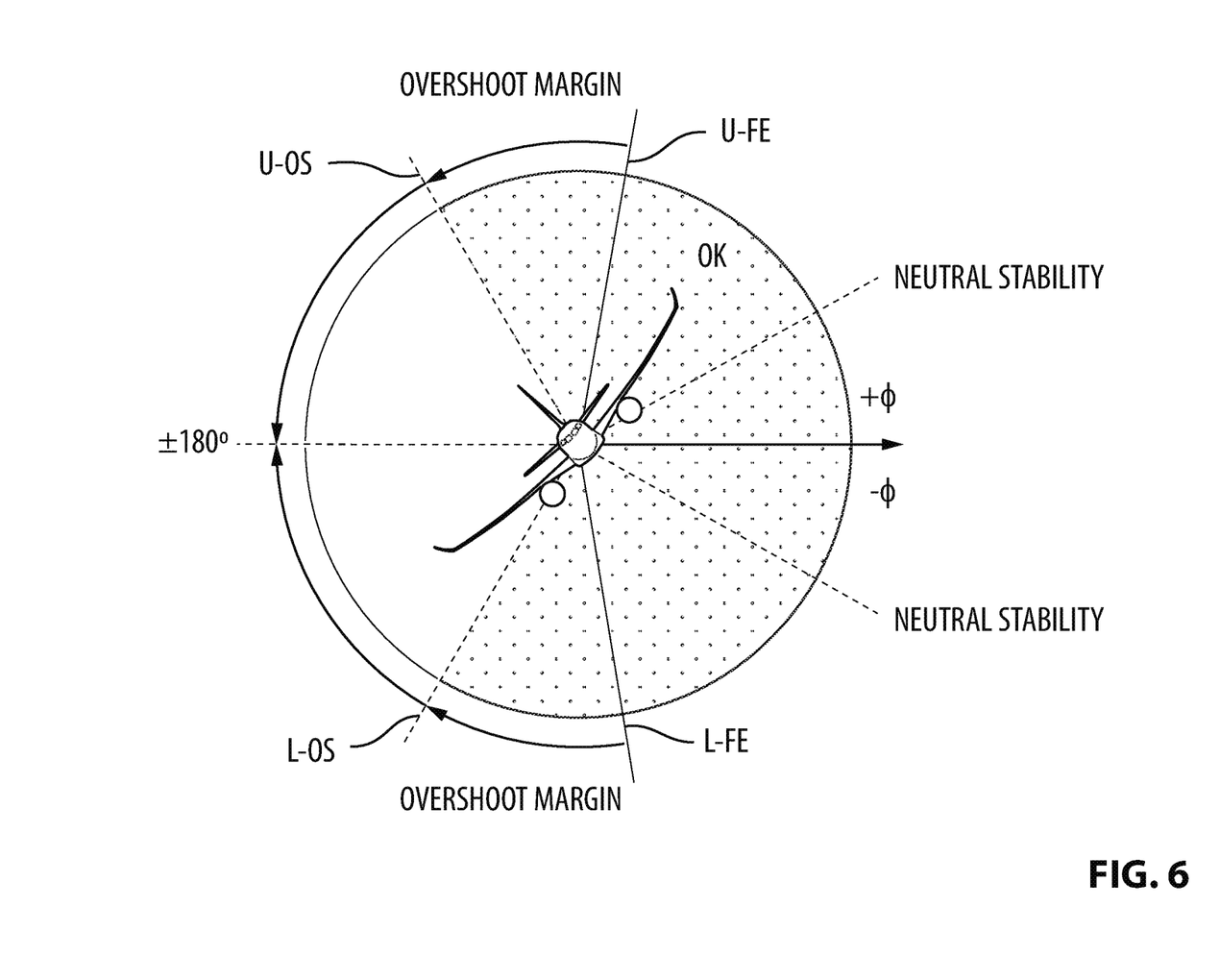
FIG. 6 is an exemplary graphical representation of an exemplary flight regime associated with the roll of the aircraft of FIG. 1.

FIG. 6 is an exemplary graphical representation of an exemplary flight regime associated with the roll of aircraft 10. Elements previously described in relation to FIG. 5 are indicated in FIG. 6 using like reference characters. In the exemplary regime shown in FIG. 6, a roll excursion between line U-OS and +180 degrees, or alternatively, between line LOS and −180 degrees will signal an out-of-flight-envelope situation. ARM 46 will then evaluate control commands output by FCC 30 to determine whether or not FCC 30 is attempting to recover aircraft 10 from the out-of-flight-envelope situation and cause FCC 30 to be taken offline if the control commands are incorrect due to a residual error for example.

Figure 7:
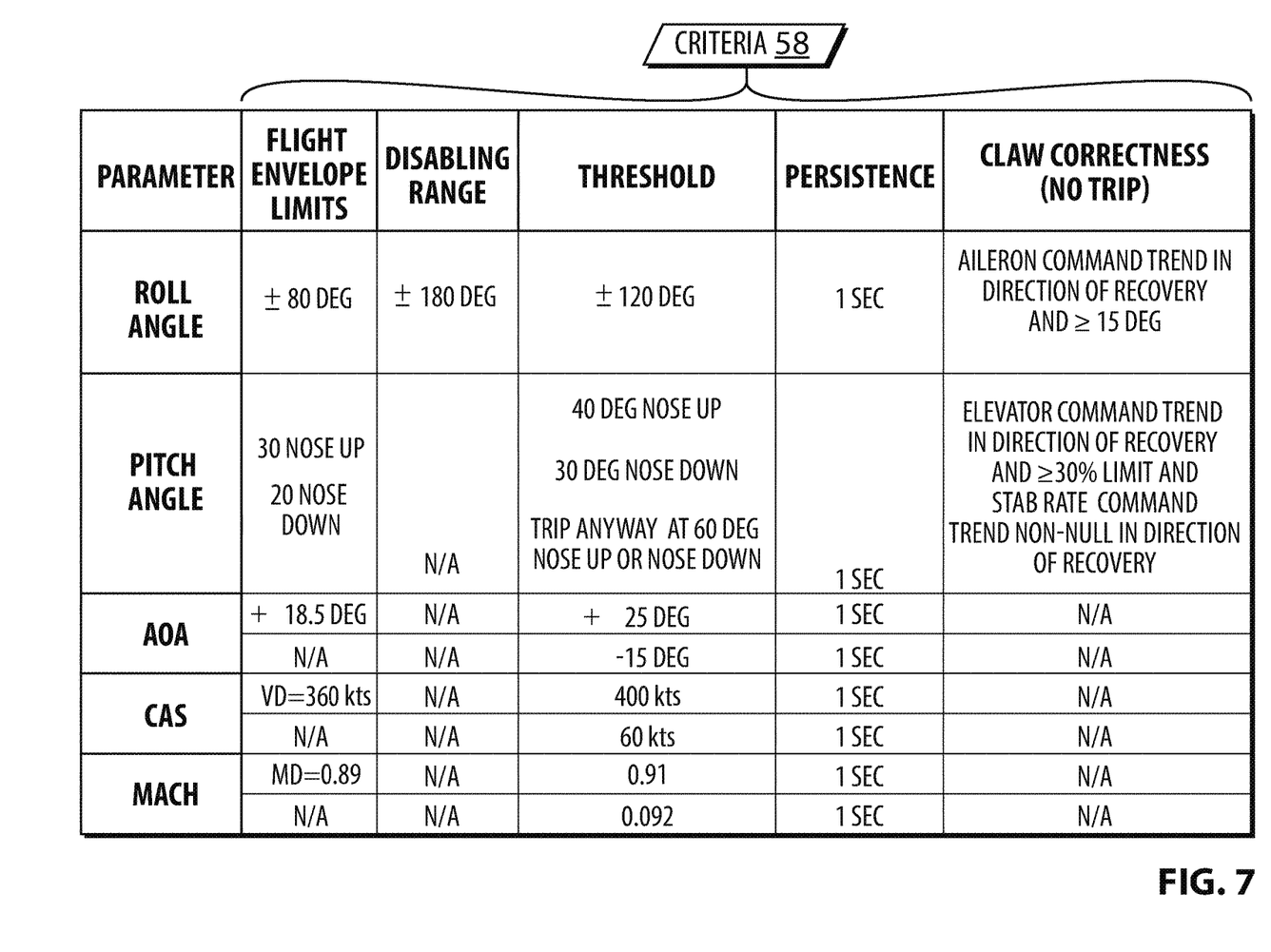
FIG. 7 is a table showing exemplary operating regimes for the aircraft response monitor of FIG. 3 for different flight parameters.

FIG. 7 is a table showing exemplary operating regimes for ARM 46 for different flight parameters of aircraft 10 including the regimes for pitch and roll angles described above in relation to FIGS. 5 and 6. Additional flight parameters that may be considered by ARM 46 may include an angle of attack (AOA) represented in degrees, a calibrated air speed (CAS) represented in knots and Mach number. The flight envelope limit for the CAS may be defined as the dive speed (VD). Similarly, the flight envelope limit for the Mach number may be the dive Mach number (MD).

FIG. 7 also shows exemplary criteria 58 (also shown in FIG. 3) that may be used by ARM 46 in the identification of an out-of-flight-envelope situation of aircraft 10 and also in the evaluation of control commands output by FCC 30 to determine whether or not FCC 30 is attempting to recover aircraft 10 from the out-of-flight-envelope situation. For example, criteria 58 may include: flight envelope limits of one or more flight parameters; an associated disabling range within which the functionality of ARM 46 may be disabled; associated threshold(s) used to activate ARM 46 or to cause ARM 46 to trip and consequently cause FCC 30 to be taken offline; associated persistence time used to identify an out-of-flight-envelope situation based on that flight parameter; and CLAW correctness conditions used to determine whether or not FCC 30 is attempting to recover aircraft 10 from the out-of-flight-envelope situation.

For example, the CLAW correctness conditions may serve to evaluate output signals 36 (i.e., control commands) generated by FCC 30 and determine whether FCC 30 is attempting to rectify the out-of-flight-envelope situation. Accordingly, CLAW correctness conditions may be associated with control commands that are associated with the particular flight parameter. With respect to roll angle for example, an associate aileron command indicative of FCC 30 attempting to rectify the out-of-flight-envelope roll situation may comprise an aileron command trending in the direction of recovery and that is equal to or greater than about 15 degrees of deflection of aileron 24. With respect to pitch angle, an associated elevator and/or horizontal stabilizer command may be evaluated by ARM 46. For example, such command indicative of FCC 30 attempting to rectify the out-of-flight-envelope pitch situation may comprise an elevator command trending in the direction of recovery and being equal or greater than about 30% of the maximum deflection of elevators 26 in combination with a command of a horizontal stabilizer of aircraft 10 in the direction of recovery. It is understood that different CLAW correctness conditions may be used for different types of flight parameters and specific applications.

In various embodiments. ARM 46 may be configured (e.g., via instructions 56 shown in FIG. 3) to evaluate the control commands (i.e., output signals 36) by computing a trend associated with a plurality of (e.g., successive) control commands instead of relying on a single control command. For example, ARM 46 may be configured to compute an average of a predetermined number of successive control commands and use such average to determine whether a residual error is manifesting itself. As explained above, ARM 46 may also consider the state of aircraft 10 by continuing to monitor the flight parameter(s) during the out-of-flight-envelope situation in its determination to whether or not take FCC 30 offline.

In some embodiments, ARM 46 may, for some flight parameters, monitor flight envelope limits and associated persistence times without necessarily using CLAW correctness conditions to determine if FCC 30 should be taken offline. For example, ARM 46 may trip and consequently cause FCC 30 to be taken offline without evaluating output signals 36 (e.g., a trend in control commands) generated by FCC 30 if one or more such flight parameters monitored by ARM 46 exceed a flight envelope limit for a predetermined amount of time. In the non-limiting exemplary values included in FIG. 8, AOA, CAS and the Mach number are indicated as having no CLAW correctness conditions associated therewith but it is understood that such flight parameters could have associated CLAW correctness conditions in some embodiments.

Figure 8:
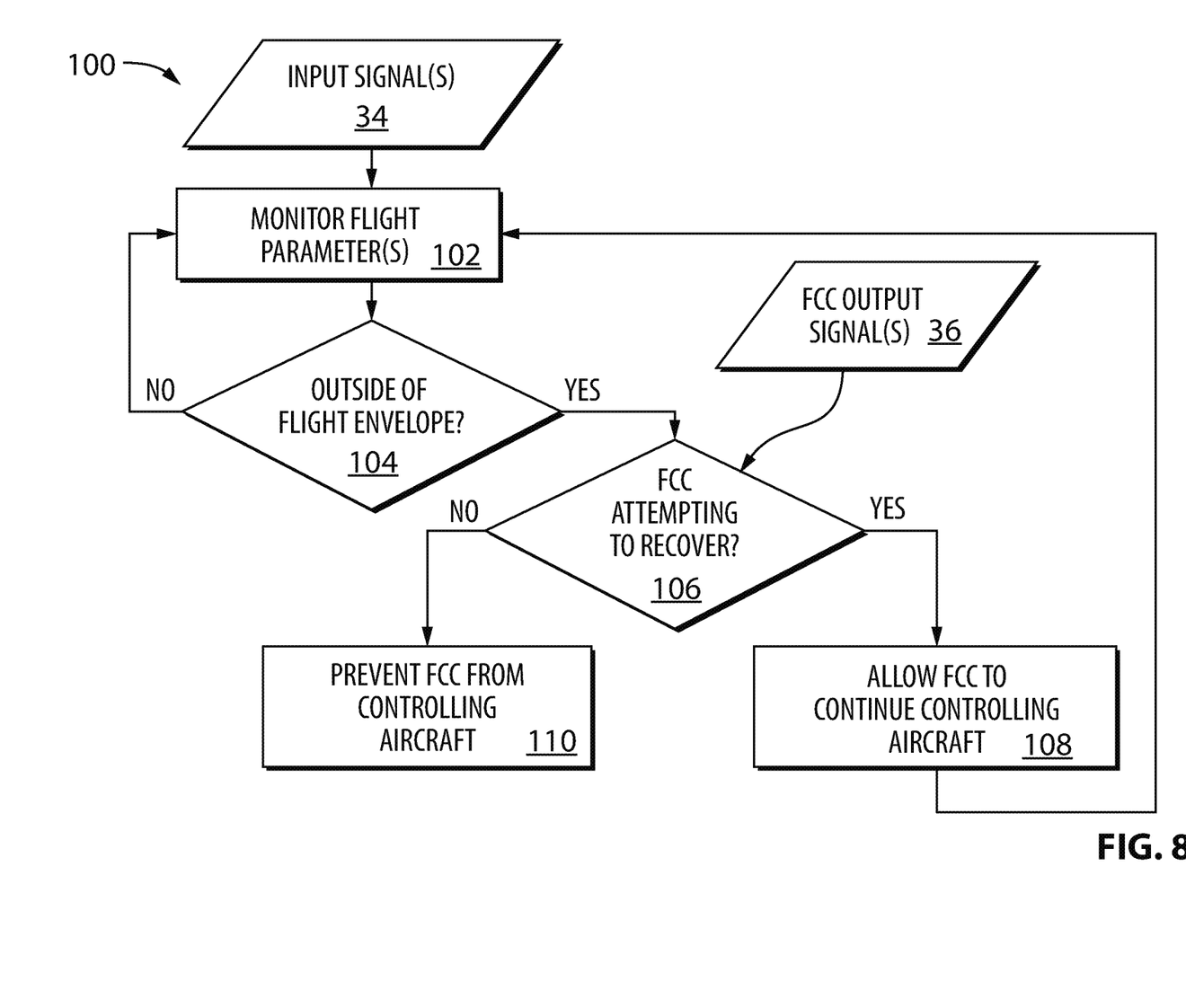
FIG. 8 is a flowchart illustrating an exemplary method for controlling an aircraft during flight.

FIG. 8 is a flowchart illustrating an exemplary method 100 for controlling aircraft 10 during flight. Method 100 may be capable of being performed entirely or in part using control system 12 and aspects of control system 12 disclosed above may also apply to method 100. In various embodiments, method 100 may be computer-implemented and may comprise: determining that a flight parameter of aircraft 10 is indicative of an out-of-flight-envelope situation of aircraft 10 while one or more aspects of operation of aircraft 10 are controlled using FCC 30 (e.g., see blocks 102 and 104); while aircraft is in the out-of-flight-envelope situation, evaluating one or more control commands (e.g., output signals 36) output by FCC 30 and associated with the flight parameter (e.g., see block 106); conditioned upon the one or more control commands being indicative of FCC 30 attempting to cause aircraft 10 to return within its flight envelope, allowing FCC 30 to continue controlling the one or more aspects of operation of aircraft 10 (e.g., see block 108); and conditioned upon the one or more control commands being indicative of FCC 30 not attempting to cause aircraft 10 to return within its flight envelope, preventing FCC 30 from controlling the one or more aspects of operation of aircraft 10.

In some embodiments, method 100 may comprise, conditioned upon the one or more control commands being indicative of FCC 30 not attempting to cause aircraft 10 to return within its flight envelope, allowing the one or more aspects of operation of the aircraft to be controlled using alternate controller 32.

In some embodiments, method 100 may comprise, conditioned upon the flight parameter reaching a trip limit (e.g., lines U-T and LT in FIG. 5) beyond a flight envelope of aircraft 10, preventing FCC 30 from controlling the one or more aspects of operation of aircraft 10 and allowing the one or more aspects of operation of aircraft 10 to be controlled using alternate controller 32. As explained above, alternate controller 32 may have reduced functionality relative to FCC 30.

In some embodiments of method 100, evaluating the one or more control commands may comprise computing a trend associated with a plurality of the control commands. For example, evaluating the one or more control commands may comprise computing an average of successive control commands.

In some embodiments of method 100, determining that the flight parameter of aircraft 10 is indicative of the out-of-flight-envelope situation of aircraft 10 may comprise determining whether the flight parameter satisfies a persistence criterion (e.g., see criteria 58 in FIG. 7).

In some embodiments of method 100, the evaluation of the one or more control commands may be conducted using one or more monitoring algorithms that are different from one or more command algorithms used by FCC 30.

In some embodiments of method 100, the evaluation of the one or more control commands may be conducted using monitoring instructions stored in a memory partition of FCC 30 that is separate from a memory partition that stores command instructions configured to generate the one or more control commands by FCC 30.

In some embodiments of method 100, the flight parameter may include, a roll angle of aircraft 10, a pitch angle of aircraft 10, an angle of attack of aircraft 10, a calibrated air speed of aircraft 10, or a Mach number of aircraft 10. In some embodiments of method 100, the flight parameter may include a combination of two or more of the foregoing flight parameters.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A method for controlling an aircraft during flight, the method comprising:
   determining that a flight parameter of the aircraft is indicative of an out-of-flight-envelope situation of the aircraft while one or more aspects of operation of the aircraft are controlled using a flight control computer;
   while the aircraft is in the out-of-flight-envelope situation:
     evaluating one or more control commands output by the flight control computer and associated with the flight parameter;
     when the one or more control commands are indicative of the flight control computer attempting to cause the aircraft to return within its flight envelope, allowing the flight control computer to continue controlling the one or more aspects of operation of the aircraft; and
     when the one or more control commands are indicative of the flight control computer not attempting to cause the aircraft to return within its flight envelope, preventing the flight control computer from controlling the one or more aspects of operation of the aircraft.

2. The method as defined in claim 1, comprising, when the one or more control commands are indicative of the flight control computer not attempting to cause the aircraft to return within its flight envelope, allowing the one or more aspects of operation of the aircraft to be controlled using an alternate control device of the aircraft.

3. The method as defined in claim 1, comprising, when the flight parameter reaches a trip limit beyond a flight envelope of the aircraft, preventing the flight control computer from controlling the one or more aspects of operation of the aircraft and allowing the one or more aspects of operation of the aircraft to be controlled using an alternate control device of the aircraft.

4. The method as defined in claim 2, wherein the alternate control device has reduced functionality relative to the flight control computer.

5. The method as defined in claim 1, wherein evaluating the one or more control commands comprises computing a trend associated with a plurality of the control commands.

6. The method as defined in claim 1, wherein evaluating the one or more control commands comprises computing an average of successive control commands.

7. The method as defined in claim 1, wherein determining that the flight parameter of the aircraft is indicative of the out-of-flight-envelope situation of the aircraft comprises determining whether the flight parameter satisfies a persistence criterion.

8. The method as defined in claim 1, wherein the evaluation of the one or more control commands is conducted using one or more monitoring algorithms that are different from one or more command algorithms used by the flight control computer.

9. The method as defined in claim 1, wherein the evaluation of the one or more control commands is conducted using monitoring instructions stored in a memory partition of the flight control computer that is separate from a memory partition that stores command instructions configured to generate the one or more control commands by the flight control computer.

10. The method as defined in claim 1, wherein the flight parameter is a roll angle of the aircraft.

11. The method as defined in claim 1, wherein the flight parameter is a pitch angle of the aircraft.

12. The method as defined in claim 1, wherein the flight parameter is an angle of attack of the aircraft.

13. The method as defined in claim 1, wherein the flight parameter is a calibrated air speed of the aircraft.

14. The method as defined in claim 1, wherein the flight parameter is a Mach number of the aircraft.

\* \* \* \* \*